April 18, 1933. C. R. HOFFMAN 1,904,232
WIRE DRAWING APPARATUS
Filed March 1, 1930
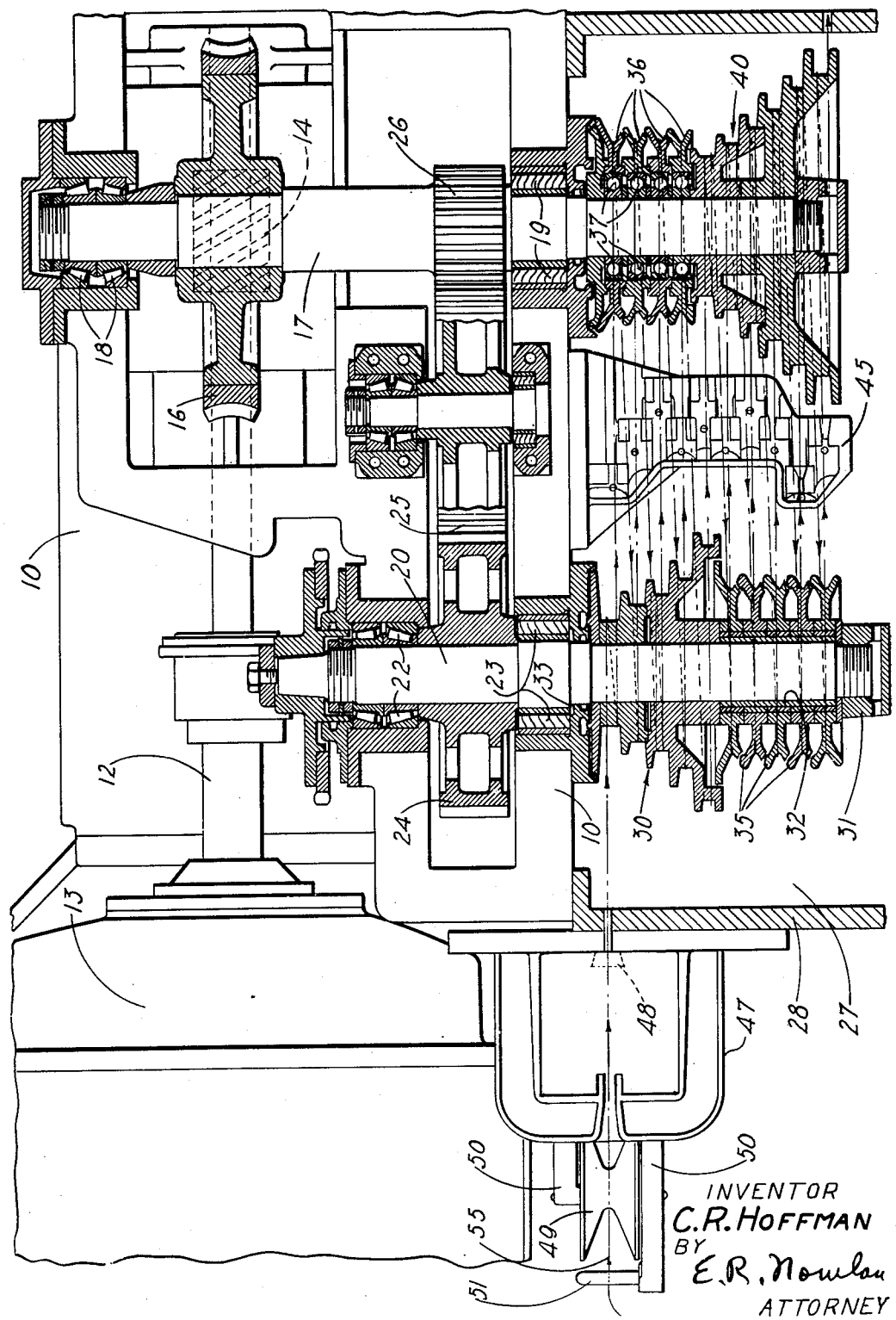
INVENTOR
C. R. HOFFMAN
BY
E. R. Nowlan
ATTORNEY Patented Apr. 18, 1933

1,904,232

UNITED STATES PATENT OFFICE

CARL R. HOFFMAN, OF BERWYN, ILLINOIS, ASSIGNOR TO WESTERN ELECTRIC COMPANY, INCORPORATED, OF NEW YORK, N. Y., A CORPORATION OF NEW YORK

WIRE DRAWING APPARATUS

Application filed March 1, 1930. Serial No. 432,341.

This invention relates to wire drawing apparatus and has for its principal object, the provision of a simple and compact apparatus for efficiently drawing wire at high speeds.

The invention contemplates the provision, in a wire drawing apparatus, of two shafts preferably driven at different speeds and each provided with a driven stepped capstan and a plurality of individually rotatable idler sheaves, the sheaves on each shaft being arranged to cooperate with the capstan on the other shaft for guiding the wire through the reducing dies interposed between the shafts.

It is believed that the invention will be clearly understood from the following detailed description of one embodiment thereof, reference being had to the accompanying drawing, in which the single figure is a fragmentary plan section of a wire drawing apparatus embodying the features of the invention.

Referring to the drawing, it will be observed that a suitable supporting framework 10 is shown partly broken away in order to illustrate more clearly the novel features of the invention. A main drive shaft 12 is suitably journaled in the framework and is driven by an electric motor 13 connected to one end thereof. Near its opposite end the shaft 12 carries a speed reducing worm 14, which drives a worm gear 16 secured to a horizontal shaft 17 journaled in roller bearings 18 and 19 mounted in the supporting framework 10. Spaced from and parallel to the shaft 17 is another horizontal shaft 20, which is disposed in the same horizontal plane as the shaft 17 and is rotatably journaled in roller bearings 22 and 23 mounted in the framework. The shaft 20 has a gear 24 secured thereto which meshes with an intermediate gear 25 driven by a gear 26 carried by the shaft 17. It will be observed that the gearing just described is constructed and arranged so that the shaft 20 is driven at a somewhat slower speed than the shaft 17.

As shown in the drawing, the shafts 17 and 20 extend beyond the front side of the framework 10 and into a wire drawing compartment 27 enclosed by a housing 28 attached to the framework. A stepped capstan 30 is carried upon the shaft 20 adjacent to the supporting framework and is fixed to the shaft so as to be rotatable therewith by means of a nut 31 threaded upon the end of the shaft, whereby the capstan is clamped between a thrust bushing 33 and a collar 32 of the shaft. A plurality of individually rotatable guide sheaves 35, 35, all of the same diameter, are mounted upon the bushing 32 so as to be freely rotatable with respect to the shaft 20. A plurality of individually rotatable guide sheaves 36, all of the same diameter and similar to the guide sheaves 35, are mounted upon the shaft 17 adjacent to the framework and opposite to the capstan 30. The sheaves 36 are provided with roller bearings 37, 37 whereby friction between the sheaves and the shaft is reduced to a minimum. A stepped capstan 40, similar to the capstan 30, is attached to the end of the shaft 17 opposite the guide sheaves 35 of the shaft 20. It will be noted that the capstans 30 and 40 are disposed with their steps of smallest diameter closest to the supporting framework, and that a guide sheave 36 is provided on the shaft 17 directly opposite each step of the capstan 30 with the exception of the last or largest step thereof, while a guide sheave 35 is provided on the shaft 20 directly opposite each step of the capstan 40 with the exception of the first or smallest step thereof. Also, the first step of the capstan 40 is disposed directly opposite the last step of the capstan 30. The purpose of this construction and arrangement will be clearly understood as the description progresses.

A bracket 45 for supporting the usual reducing dies (not shown) is secured to the framework 10 intermediate the shafts 17 and 20 and is so constructed and designed that the space between the two shafts may be reduced to a minimum, thus providing a compact arrangement of the parts in the wire drawing compartment.

Mounted outside upon the left hand end of the housing 28 is a trough like member 47 for carrying a suitable lubricating material within which the first reducing die is mounted, as indicated at 48. An idler pulley 49 is mounted between spaced arms 50—50 extending from the trough 47, one of the arms 50 being extended to support a guard pin 51 for retaining the wire within the groove of the pulley.

In the operation of the above described apparatus, a wire 55 to be drawn is first strung in a well known manner with the usual reducing dies, and is then threaded under the guide pin 51, over the idler pulley 49, through the trough 47 wherein the first reducing die 48 is positioned as shown, and then into the wire drawing compartment 27, wherein it is passed around the first or smallest step of the capstan 30, around the first guide sheave 36, and then around the second step of the capstan 30 and the second guide sheave 36, etc., back and forth around each succeeding step of the capstan 30 and the oppositely disposed guide sheaves 36. From the last or largest step of the capstan 30 the wire is passed around the first or smallest step of the capstan 40, and then around the first guide sheave 35, the second step of the capstan 40, the second guide sheave 35, etc., around each succeeding step of the capstan 40 and the oppositely disposed guide sheave 35. The reducing dies are placed in their proper positions in the supporting bracket 45. From the last or largest step of the capstan 40 the wire passes to a suitable take-up (not shown) whereby it is coiled or wound around a spool or reel.

The stepped construction of the capstans 30 and 40 serves to accommodate the gradually increasing length of the wire incident to the drawing operation. By driving the shaft 17 at a higher speed than the shaft 20, the first step of the capstan 40 may be considerably smaller than the last step of the capstan 30, and consequently, the final step of the capstan 40 may be considerably reduced in size. Thus, the distance between the two shafts and therefore the size of the wire drawing compartment may be reduced considerably, which results in a substantial saving of floor space, especially where a large number of machines are employed. Also, by providing two capstans on separate shafts and reducing the size of the final steps of the capstans, the guide sheaves and the capstans are rendered more conveniently accessible to the operator for the threading operation.

It is to be understood that the invention is not limited to the specific embodiment thereof herein illustrated and described, except in so far as is defined by the appended claim.

What is claimed is:

In a wire drawing apparatus, a pair of spaced shafts, means for rotating said shafts, a multi-step capstan secured to one of said shafts, a multi-step idler sheave rotatably mounted over said other shaft and opposite said multi-step capstan, a second multi-step capstan secured to said other shaft adjacent said idler sheave, and a second idler sheave mounted over said first mentioned shaft adjacent said first mentioned capstan and opposite said second mentioned capstan, each successive step of each of said capstans having a larger diameter than the preceding step, the largest step of said first mentioned capstan substantially opposite the smallest step of said second mentioned capstan, and the largest step of said second mentioned capstan more remote from the smallest step of said first mentioned capstan than from any other step of said first mentioned capstan.

In witness whereof, I hereunto subscribe my name this 21st day of February A. D., 1930.

CARL R. HOFFMAN.